US006432192B1

(12) United States Patent
Cook et al.

(10) Patent No.: US 6,432,192 B1
(45) Date of Patent: Aug. 13, 2002

(54) PROCESS FOR MANUFACTURING PIGMENTS

(75) Inventors: Wayne L. Cook, Chelsea, MI (US); Douglas P. Gebler, Elizabethtown, KY (US); Norman E. Pratt, Northville, MI (US)

(73) Assignee: Flint Ink Corporation, Ann Arbor, MI (US)

( * ) Notice: Subject to any disclaimer, the term of this patent is extended or adjusted under 35 U.S.C. 154(b) by 0 days.

(21) Appl. No.: 09/510,777

(22) Filed: Feb. 23, 2000

(51) Int. Cl.$^7$ .......................... C09B 67/54; C09D 11/00
(52) U.S. Cl. ...................... 106/496; 106/31.6; 106/471; 106/494; 106/496; 106/498
(58) Field of Search ................. 106/493, 471, 106/494, 496, 498, 31.6

(56) References Cited

U.S. PATENT DOCUMENTS

| | | | |
|---|---|---|---|
| 4,329,145 A | 5/1982 | Koll et al. .................. 8/527 |
| 4,560,746 A | 12/1985 | Rebhahn et al. ........... 534/840 |
| 4,810,390 A | * 3/1989 | Flierl et al. ................. 210/650 |
| 5,227,349 A | 7/1993 | Matthews et al. .......... 501/145 |
| 5,522,924 A | 6/1996 | Smith et al. ................ 106/488 |
| 5,766,269 A | * 6/1998 | Berenguer et al. ......... 8/652 |
| 5,985,016 A | 11/1999 | Tsang et al. .............. 106/31.64 |

FOREIGN PATENT DOCUMENTS

| | | | |
|---|---|---|---|
| DE | 3301870 | * | 7/1984 |
| EP | 0 263 791 | | 4/1988 |
| EP | 0 287 515 | | 10/1988 |
| EP | 0 302 015 | | 2/1989 |
| FR | 2 207 169 | | 6/1974 |
| FR | 2 365 609 | | 4/1978 |
| FR | 2 513 649 | | 4/1983 |
| GB | 2 014 597 A | | 8/1979 |
| GB | 1 552 080 | | 9/1979 |

OTHER PUBLICATIONS

Chemical Abstract No. 131:131248h, abstract of Japanese Patent Specification No. 10–183008 (Jul. 1998).*
Patent Abstracts of Japan, abstract of Japanese Patent Specification No. 11–166131 (Jun. 1999).*
David J. Paulson, Richard L. Wilson, & D. Dean Spatz, "Crossflow Membrane Technology and Its Applications," *Food Technology*, pp. 77–111 (Dec. 1984).
Abstract of JP 11166131 A, Derwent Publications, Ltd., London, GB –Derwent Database WPI Jun. 1999.

* cited by examiner

*Primary Examiner*—Anthony Green
(74) *Attorney, Agent, or Firm*—Harness, Dickey & Pierce, P.L.C.

(57) ABSTRACT

A pigment is synthesized in an aqueous medium and the pigment dispersion is purified by ultrafiltration or microfiltration. In particular, an aqueous pigment dispersion having a very small average particle size and a narrow particle size distribution may be prepared by the steps of (a) synthesizing a pigment in an aqueous medium and
(b) removing an impurity such as a dissolved synthesis by-product or unreacted starting material through cross flow filtration using a membrane having an average pore diameter of from about 3 nanometers to about 3000 nanometers to produce a purified aqueous pigment dispersion.

29 Claims, No Drawings

PROCESS FOR MANUFACTURING PIGMENTS

FIELD OF THE INVENTION

The invention concerns methods for synthesizing and purifying organic pigments. The invention is further directed to methods for preparing inks containing pigments having fine particle size and very low levels of impurities.

BACKGROUND OF THE INVENTION

Printing inks for ink jet printers have become an important segment of the ink market. In general, the ink of ink jet printers is emitted through one or more small orifices or nozzles. In continuous ink jet printers, a continuous stream is ejected under pressure through the nozzles and broken up into electrically charged droplets at a fixed distance from the orifice. At the break-up point, the electrically charged ink droplets are passed through an electrical field that adjusts the trajectory of the droplets according to digital data signals to direct the droplets either to the printing medium to create an image or to a gutter for collection and re-circulation. In drop-on-demand ink jet printers, typically used for desktop printing with personal computers, the ink is emitted from the nozzles in droplets as needed to create an image on the printing medium. Desktop printers are commonly thermal ink jet, or bubble jet, printers. The thermal ink jet printer has an ink filled channel with a nozzle at one end and a heat generating resistor near the nozzle. The computer sends an signal that generates an electric current pulse in the resistor, heating the ink in the immediate vicinity of the resistor. The heat evaporates the ink to create a bubble. The ink at the orifice is forced out of the nozzle as a propelled droplet at high speed as the bubble expands.

Ink jet inks have historically been based on dyes, which are soluble colorants, because pigmented inks have had a tendency to clog the jet nozzles, which then must be cleaned before the printer can operate properly again. Dyes, however, have the shortcoming of being less colorfast than pigments. Printed dye-based aqueous ink jet inks can smear if they get wet. Thus, pigments would be desirable for ink jet inks, but the pigments must have very small particle sizes, typically less than 1 micron and usually less than about 0.4 micron, so that the pigment will not clog the ink jet nozzles.

Synthesis of pigments with very small particle sizes for ink jet printer inks has presented some problems. Syntheses of many organic pigments include a coupling step in a dilute aqueous medium to produce a slurry of the pigment product, which is followed by a step of filtering the slurry in a filter press or with a basket centrifuge to purify and concentrate the pigment by removing the water phase along with dissolved salt impurities. Very small pigment particles, however, are difficult to filter by conventional processes. For example, in filter presses such fine pigment particles "blind" the filter media; in other words, the fine pigment particles block the pores of the filter and prevent water from passing through the filter. Because the traditional filtering processes work so poorly for very small pigment particles, pigments for ink jet printer inks are presently manufactured as a flocculated pigment that has a larger particle size. The flocculated pigments can be filtered by conventional means but must then be dried, mechanically ground to again obtain the very small size needed for ink jet printer inks, and dispersed in a suitable ink vehicle. The added steps, particularly the mechanical grinding process, add considerable cost and, moreover, produce a pigment with a broader particle size distribution than is desirable.

Japanese application JP 10 183,008, published Jul. 7, 1998, describes purification of aqueous colorants using a charged, mosaic membrane containing particulate cationic and anionic polymers (i.e., an ion exchange membrane). Ion exchange membranes are costly, however, and must periodically be "recharged" by replacing the undesirable ions removed by the filtration. These shortcomings result in increased cost and decreased manufacturing flexibility.

It would be desirable to have a method for preparing synthetic organic pigments with the fine particle size and high purity necessary for ink jet inks that would overcome the problems of the present methods of synthesizing the pigment, flocculating the pigment for filtering, filtering the pigment, drying the pigment, grinding the pigment to again obtain a fine particle size, and re-dispersing the pigment.

The present invention concerns purification of aqueous pigment compositions with membrane separation processes. Membrane separation processes, also referred to as cross flow filtration, include (in increasing pore size order) nanofiltration, ultrafiltration, and microfiltration. Membrane separation processes have previously been used to purify dye solutions. One example of the dye solution purification process is described in Rebhahn et al., U.S. Pat. No. 4,560,746, incorporated herein by reference. The '746 reference discloses that purification of a dye requires a membrane having a nominal pore size of 5–15 Angstroms, falling in the range of nanofiltration. The dye solution is carefully pre-filtered to remove all particulate matter before it is introduced to a nanofiltration membrane so that the pores will not become blocked.

Japanese application 11 166,131, published Jun. 22, 1999, describes preparing a liquid dispersion of an oxidation-treated (acidified) carbon black, subjecting the dispersion to ultrafiltration and dialysis, and then further treating the dispersion with an ion exchange membrane. Carbon blacks are prepared by pyrolyzing (ashing) carbonaceous materials such as acetylene. The carbon black is obtained as a powder and may be surface treated, for example oxidized as described in the JP '131 reference. The JP '131 reference does not discuss pigment prepared by organic synthesis or methods for methods for rendering such organic synthetic pigments suitable for ink jet inks.

SUMMARY OF THE INVENTION

The present invention provides a simplified method for producing aqueous synthetic organic pigment dispersions for use in ink jet inks. Unlike previous methods, the invention is effective in preserving a narrow particle size distribution of the pigment as synthesized. In a first embodiment, the present invention provides a process for purifying pigment that is particularly suited to pigment having a very small particle size. Preferably, for ink jet applications, the pigment has a maximum particle size of about 400 nm. That is, the particle size distribution is such that 100% of the particles have a particle size of about 400 nm or less. For other kinds of inks, such as flexographic inks, the maximum particle size may be significantly greater, such as about 2 microns. The particle size distribution of the pigment should be narrow.

In a first step of the inventive method, a pigment is first synthesized in an aqueous medium and, in a second step, the aqueous dispersion of the synthesized pigment is purified using a cross flow filtration method in which the average pore diameter is from about 3 nanometers to about 3000 nanometers. The pigment is preferably prepared under conditions that preferably produce average particle sizes of up to about 1 micron. The aqueous purified pigment dispersion product preferably has a particle size range in which the minimum particle size is at least about 0.01 micron and the maximum particle size is up to about 1 micron. In a more preferred embodiment, the minimum particle size is at least about 0.03 micron and the maximum particle size is up to about 0.4 micron. At least one impurity, which may be a by-product of the synthesis, an unreacted starting material used for the pigment synthesis, or another impurity, is then removed from the aqueous pigment reaction mixture by the cross flow filtration.

The cross flow filtration of the inventive process, in which the average pore diameter is from about 3 nanometers to about 3000 nanometers, is often referred to as ultrafiltration (pore diameters of perhaps 3 nanometers up to about 300 nanometers) and microfiltration (pore diameters of perhaps 300 nanometers up to about 3000 nanometers). For convenience, the term "ultrafiltration" will sometimes be used to refer this process step, but it should be understood that the cross flow filtration of the invention extends to larger pore diameters of up to 3000 nanometers and encompasses both ultrafiltration and microfiltration.

The present invention also provides a process for preparing ink composition with the purified pigments, particularly ink jet inks.

In another embodiment of the invention, the step of producing the purified aqueous pigment dispersion by the cross flow filtration is combined with one or more further steps that may include (a) pressing the aqueous pigment dispersion to remove at least a part of the water, (b) drying the purified pigment dispersion to produce a dry purified pigment, and/or (c) transferring the pigment from the aqueous medium to an organic medium (e.g., by flushing the pigment dispersion).

DETAILED DESCRIPTION OF THE INVENTION

The present process is particularly desirable as a means of purifying pigments that are synthesized at relatively small average particle sizes and/or relatively narrow particle size distributions because the original particle sizes and particle size distributions can be maintained. Very small particle size pigments may be produced by reaction under conditions including, without limitation, (1) coupling at high dilution (about 5% by weight or less, preferably about 1% by weight or less based on the total weight of the reactants and the aqueous medium); and/or (2) coupling in the presence of higher levels of water-soluble resins, surfactants, or polymeric dispersants.

Examples of useful water-soluble resins that may be used in producing the small particle size pigments include, without limitation, ionic resins such as alkyd resins, polyesters, maleic modified rosins and other maleic-modified polymers, fumaric modified rosins and other fumaric modified polymer, vinyl resins including acrylic resins, low molecular weight, acid-functional polyurethanes, amino resins such as melamine formaldehyde resins, styrene-maleic anhydride (SMA) copolymers, polymers and copolymers of ethylene oxide, polyimines, and so on. When included, the resins or polymers are typically used at level of from about 2% to about 50% based on the weight of the pigment, preferably from about 5% to about 40% based on the weight of the pigment.

Examples of suitable surfactants and dispersants that may be used in producing the small particle size pigments include, without limitation, anionic surfactants, including fatty acids such as palmitic acid, stearic acid, and oleic acid; alkylbenzenesulfonates; alkylnaphthalene sulfonates; alkylphenol polyglycol ether sulfates; and fatty alcohol polyglycol ether sulfates; nonionic surfactants such as ethoxylated fatty alcohols and ethoxylated alkylphenols; amphoteric surfactants such as amine oxide surfactants, including cocodimethylamine oxide and tetradecyldimethylamine oxide; cationic surfactants, including fatty amines like cocoamine, dimethyldodecylamine, cocodimethylamine, and N-tallow-1,3-diaminopropane, and ammonium salts including hexadecyltrimethyl ammonium chloride and hydrogenated tallow trimethyl ammonium chloride; and polymeric dispersants. Surfactants may be included in amounts of at least about 1% by weight, preferably at least about 3% by weight, based on the weight of the pigment. Surfactants may be included in amounts of up to about 25% by weight, preferably up to about 10% by weight, based on the weight of the pigment.

The aqueous resin, surfactant, or dispersant, if used, can be present during the pigment synthesis reaction or can be added after the synthesis is complete.

The present process can be used with a variety of pigments synthesized in aqueous media, including, without limitation, azo pigments such as lithol reds, rubine reds, and naphthol reds, oranges, and browns; monoarylide and diarylide pigments such as diarylide yellow, and rhodamine pigments such as rhodamine yellow and rhodamine blue. The pigment dispersion as synthesized typically has one or more undesirable impurities. Impurities include by-products of the reaction, unreacted starting materials for the reaction, and additives such as surfactants or salts that are included during the reaction but which are undesirable in the pigment product. By-product impurities include, without limitation dissolved salt impurities, notably sodium salts, barium salts, and calcium salts, in particular halides (e.g., chlorides), acetates, and sulfates of sodium, barium, and calcium. Additionally, the pigment synthesis is usually carried out using an excess of the coupling agent, which should also be removed. Typical by-products and impurities of pigment synthesis that can be removed by the process of the invention include, without limitation, unreacted starting materials, materials that were added in excess to the reaction mixture, such as aromatic amines and coupling compounds like β-naphthol, and by-products, such as sodium chloride, sodium acetate, sodium sulfate, other alkali salts or alkaline earth salts such as calcium, barium, or strontium salts. It is also desirable to remove, and not replace, a part of the water to increase the solid content of the pigment dispersion.

The unpurified, aqueous synthesized pigment dispersions may have, for example, from about 0.5 to about 5% by weight of the synthesized pigment, based on the total weight of the aqueous dispersion. The synthesized pigment dispersion may have a significant amount of impurities. Typically, the dispersion may contain as much or more by weight of impurities as the weight of the synthesized pigment. In the process of the invention, the synthesized pigment dispersion is filtered using an ultrafiltration (or microfiltration) membrane having an average pore diameter of from about 3 nanometers to about 3000 nanometers to remove at least a part of at least one impurity to produce a purified aqueous pigment dispersion. The ultrafiltration process is used to separate a part of the aqueous medium, along with one or more impurities, from the remainder of the pigment dispersion. The volume of aqueous medium removed by the process can be replaced in the pigment dispersion in full or in part with water that does not have such impurities. Alternatively, the volume of water removed need not be replaced in order to obtain a more concentrated pigment dispersion.

Ultrafiltration (or microfiltration) of the pigment dispersion is continued, with recycling of the pigment dispersion across the ultrafiltration membrane as necessary, until the desired purity of the pigment dispersion is reached. The ultrafiltration process typically may result in removal of from about 2% to about 20% of the total volume of water per pass, based on the amount of water in the initial dispersion. It is desirable to remove at least 50% of the impurity. During multiple passes through the membrane filtration system, substantially all, 98% or more, of the impurity may be removed. The amount of impurity and the volume of water removed will depend upon factors apparent to the those with knowledge of ultrafiltration and microfiltration processes, such as the specific membrane utilized, the pressure exerted during the process, the length of time that the ultrafiltration is continued to obtain the desired purity, and so on. During the ultrafiltration process it may be desirable to concentrate the pigment dispersion by not replacing all of the water that is removed. The purified pigment dispersion may have a pigment concentration of at least about 30% pigment by weight, preferably at least about 35% pigment by weight, if not all of the water removed by ultrafiltration is replaced.

Ultrafiltration membranes are described generally in Paulson et al., "Crossflow Membrane Technology and Its Applications," Food Technology, pages 77–111 (December 1984), incorporated entirely herein by reference. Ultrafiltration and microfiltration membranes for the present process typically have a layer with a nominal pore diameter substantially smaller than the pigment particles. The average pore diameter may be from about 3 nanometers to about 3000 nanometers. Preferably, the average pore diameter is from about 5 nanometers to about 300 nanometers. In a preferred embodiment, the nominal molecular weight cut-off of polymer for the layer is preferably at least about 50,000. The membrane includes a layer of a porous, open film on the side from which permeate flows and one or more layers having smaller pore sizes on the side that contacts the pigment dispersion. It was previously believed that small pigment particles could not be purified because particles would block the pores, by plugging the pore or by bridging, to render the filter unworkable. The ultrafiltration parameters can be adjusted, for example by providing a high flow rate of the pigment dispersion, however, to keep the membrane "clean" and prevent a concentrated layer of pigment from building up that might hinder further removal of water. Pressures of about 100 to about 200 psi are typical.

In addition to maintaining the flow rate mentioned, it is also desirable during the ultrafiltration process to maintain a certain amount of shear or turbulence at the surface of the ultrafiltration membrane that contacts the pigment dispersion so that, as water is removed creating a pigment dispersion layer at the membrane surface that is more concentrated in pigment, the pigment particles are not displaced from the dispersion and do not build up a layer of pigment on the membrane that would reduce the filtering efficiency of the membrane. The shear or turbulence may preferably be created by designing baffles or other such structures along the path of the pigment slurry through the ultrafiltration membrane and by maintaining a high flow rate across the membrane surface.

The filtered, purified pigment dispersion can be concentrated to a desired concentration of pigment. The purified pigment slurry can be produced with a concentration of preferably up to about 35% by weight pigment. In a more preferred embodiment, the pigment slurry contains at least about 10% and may contain up to about 20% by weight pigment. The purified aqueous pigment dispersion may be further concentrated to obtain a dispersion that is from about 10% to about 40% by weight pigment.

The purified aqueous pigment dispersion may be subjected to further processing steps. In one embodiment, the purified aqueous pigment dispersion is dried in a further step to obtain a dry, purified pigment. Using this process, a pigment may be prepared with small average particle size and/or narrow particle size distribution and purified by ultrafiltration, then dried to a dry pigment, thereby preserving the original fine particle size and narrow particle size distribution throughout the processing of the pigment. The dried pigment may be used in a dry ink composition, e.g., a toner, in an organic solvent-based ink composition, or in an aqueous ink composition. In contrast, current methods of agglomerating the particles, pressing the aqueous dispersion to a presscake, and then drying the pigment produces agglomerated pigment particles that must be de-agglomerated in the product.

In another variation, the purified aqueous pigment dispersion can be pressed to produce a presscake, although agglomerating the particles may not be desirable in some instances, as already mentioned.

In a further step, the pigment of the purified aqueous pigment dispersion may be transferred to an organic medium, e.g., by a flushing process as known in the art. The pigment may be flushed with or without a first step of preparing a presscake from the purified aqueous pigment dispersion, and it would be preferable not to prepare a presscake when it is desirable to maintain a fine, average particle size and/or narrow particle size distribution. The organic dispersion of the purified pigment can be included in nonaqueous inks.

The process of the invention can be used to purify pigment synthesized at conventional particle sizes, such as up to about 10 microns or having a particle size range of at least about 0.5 and up to about 1.5 or up to about 2 microns, but it is particularly advantageous to employ the process for the small pigment particle sizes that cannot be purified easily by other means. Thus, the purified product preferably has a particle size range in which the minimum particle size is about 0.01 micron and the maximum particle size is about 1 micron. A more preferred minimum particle size is about 0.03 micron. A more preferred maximum particle size is about 0.4 micron. Particle sizes of less than about 0.01 micron are not desirable because such small sizes are too transparent and also exhibit poorer lightfastness.

In a preferred embodiment, the purified aqueous pigment dispersion is prepared at a desired concentration and incorporated in an aqueous ink composition. For example, and without limitation, the purified pigment dispersions can be concentrated and formulated directly into aqueous ink jet inks or flexographic inks. In this case, one or more purified pigment dispersions are combined with aqueous varnishes and/or other typical ink components.

Likewise, a dried purified pigment may be included in an ink composition. In the case of the dried pigment, the ink composition may be an aqueous ink composition, an organic solvent-based ink composition, or a dry ink (e.g., toner) composition.

If the purified pigment is transferred to an organic medium, the resulting dispersion may be included in an organic solvent-based ink composition.

The pigment dispersion may be made into an ink base or a finished ink composition by introducing additional materials selected from varnishes, other resins and polymers, organic solvents and cosolvents, and/or additives. Typical resins used as ink varnishes that may be added include, without limitation, alkyd resins, polyesters, phenolic resins, rosins, cellulosics, and derivatives of these such as rosin-modified phenolics, phenolic-modified rosins, hydrocarbon-modified rosins, maleic modified rosin, fumaric modified rosins; hydrocarbon resins, vinyl resins including acrylic resins, polyvinyl chloride resins, vinyl acetate resins, polystyrene, and copolymers thereof; polyurethanes, polyimine resins, and so on. Combinations of such resins may also be employed. Suitable examples of organic solvents for aqueous inks include, without limitation, alcohols, glycols, glycol ethers, glycol ether esters, and combinations of these. If the purified pigment is dried in a further step and then used in organic solvent-based inks, solvents may include aliphatic hydrocarbons such as petroleum distillate fractions and normal and isoparaffinic solvents with limited aromatic character. Any of the many additives known in the art that may be included in the ink compositions of the invention, so long as such additives do not significantly detract from the benefits of the present invention. Illustrative examples of these include, without limitation, pour point depressants, surfactants, wetting agents, waxes, emulsifying agents and dispersing agents, defoamers, antioxidants, UV absorbers, dryers (e.g., for formulations containing vegetable oils), flow agents and other rheology modifiers, gloss enhancers, and anti-settling agents. When included, additives are typically included in amounts of at least about 0.001% of the ink composition, and the additives may be included in amounts of up to about 7% by weight or more of the ink composition.

Pigment dispersions and inks produced are produced according to the processes of the invention with higher quality and purity, narrower and more reproducible particle size distributions, and at a lower cost compared to those of previously known processes.

The purified pigments may be included in a wide variety of ink compositions. It is particularly desirable to include the pigments in compositions where high purity and small average particle size and/or narrow particle size distributions offer an advantage, for example, and without limitation, in ink jet inks and flexographic inks.

The invention is illustrated by the following example. The example is merely illustrative and does not in any way limit the scope of the invention as described and claimed. All parts are parts by weight unless otherwise noted.

EXAMPLE 1

Pigment Red Pigment Red 22 Synthesis and Purification

A beaker was charged with water, 11.4 grams of Fast Scarlet G Base (2-methoxy-5-nitroaniline), and 19.9 grams of 35% hydrochloric acid. This mixture was stirred until the Fast Scarlet G Base was completely dissolved. The solution was cooled with ice and a solution of 4.8 grams of sodium nitrite in 50 ml of water was added to diazotize the Fast Scarlet G Base. The diazotization reaction was stirred for one hour while maintaining a slight excess of sodium nitrite (as detected by starch/Kl paper).

A beaker was charged with water, 18.8 grams of Naphthol AS (3-hydroxy-2-naphthanilide), and 15.2 grams of 50% sodium hydroxide solution. This mixture was heated and stirred until the Naphthol AS completely dissolved. A non-ionic surfactant (3.3 g) was added and the pH of the Naphthol AS solution was then adjusted to 11.8 to 12.2.

The diazotization reaction mixture was then added to the coupling reaction mixture over 25 to 30 minutes. After all of the diazotization reaction mixture was coupled, the Pigment Red 22 slurry was stirred for about 30 minutes and 60 g of a 25% aqueous acrylic polymer was added to the pigment slurry. The pigment slurry was then heated to 90° C. and held at this temperature for 2 hours with stirring.

A membrane purification (ultrafiltration) was then carried out on the Pigment Red 22 slurry. The Pigment Red 22 slurry was pumped through an ultrafiltration test cell at ~100 psi and ~25° C. The test cell was equipped with a flat sheet thin-film composite ultrafiltration membrane with a nominal molecular weight cutoff of ~50,000. The concentrate stream (containing the pigment) was recycled back to the feed tank. The permeate stream (water and solutes which passed through the membrane) was discarded. Permeate water was replaced as required to maintain a slurry concentration of 3 to 10% pigment.

When the conductivity of the pigment concentrate reached ~1000 microSiemens (microS), replacement of the permeate water was stopped and the slurry concentration allowed to increase to ~6%. The volume average particle size of the purified Pigment Red 22 dispersion was 0.16 microns with no particles larger than 0.4 microns.

EXAMPLE 2

Pigment Yellow 74 Purification

A membrane purification (ultrafiltration) was then carried out on a Pigment Yellow 74 synthesis product having a volume average particle size of 0.35 microns with 80% of the particles being less than 0.4 microns. The Pigment Yellow 74 dispersion was pumped through an ultrafiltration test cell at about 200 psi and about 25 to 50° C. The test cell was equipped with a flat sheet thin-film composite ultrafiltration membrane with a nominal molecular weight cutoff of 50,000. The concentrate stream containing the pigment was recycled back to the feed tank. The permeate stream, containing the water and solutes that had passed through the membrane, was discarded. Permeate water was replaced with deionized water as required to maintain a dispersion concentration of 3 to 0% pigment.

When the conductivity of the pigment concentrate reached about 2500 micros, replacement of the permeate water was stopped and the slurry concentration was allowed to increase to about 12.5%. The average particle size of the purified Pigment Yellow 74 dispersion was about 0.1 micron with no particles larger than 0.34 microns.

Ink Jet Testing Samples of the purified pigments of Example 1 and Example 2 were formulated into ink jet inks as follows

| Component | Pigment Red 22 Ink | Pigment Yellow 74 Ink |
|---|---|---|
| DI Water | 8.6% | 48.7% |
| Pigment Dispersion of Example 1 | 72.2% | |
| Pigment Dispersion of Example 2 | | 32.0% |
| N-methyl Pyrrolidone | 4.0% | 4.0% |
| Propylene Glycol | 8.0% | 8.0% |
| Polypropylene Glycol | 6.0% | 6.0% |
| Anticorrosive | 0.1% | 0.1% |
| Antibacterial | 0.1% | 0.1% |

These formulations were blended on a high speed mixer (Cowles Mixer) and then loaded into a Hewlett-Packard ink jet ink cartridge. This ink printed with good color density and did not plug the print head.

The invention has been described in detail with reference to preferred embodiments thereof. It should be understood, however, that variations and modifications can be made within the spirit and scope of the invention and of the following claims.

What is claimed is:

1. A process for synthesizing a pigment and removing an impurity from the synthesized pigment, comprising steps of:
   (a) synthesizing a pigment in an aqueous medium to produce an aqueous pigment dispersion that includes an impurity;
   (b) subjecting the pigment dispersion to cross flow filtration using a membrane having an average pore diameter of from about 3 nanometers to about 3000 nanometers, wherein at least about 50% of the impurity is removed to produce a purified aqueous pigment dispersion and wherein said impurity comprises at least one member selected from the group consisting of sodium salts, barium salts, calcium salts and combinations thereof.

2. A process according to claim 1, wherein the impurity comprises at least one member selected from the group consisting of unreacted materials from the pigment synthesis step and by-products from the pigment synthesis step, and combinations thereof.

3. A process according to claim 1, wherein at least about 50% of the impurity is removed in step (b).

4. A process according to claim 1, wherein at least about 98% of the impurity is removed in step (b).

5. A process according to claim 1, wherein the impurity comprises a sodium salt.

6. A process according to claim 1, wherein the impurity comprises a barium salt.

7. A process according to claim 1, wherein the impurity comprises a calcium salt.

8. A process according to claim 1, wherein the impurity comprises a member selected from the group consisting of sodium chloride, sodium acetate, and combinations thereof.

9. A process according to claim 1, wherein the pigment synthesized in step (a) has an average particle size of up to about 2 microns.

10. A process according to claim 1, wherein said purified aqueous pigment dispersion has a particle size range with a minimum particle size of at least about 0.01 micron and a maximum particle size of up to about 1 micron.

11. A process according to claim 1, wherein said purified aqueous pigment dispersion has a particle size range with a minimum particle size of at least about 0.03 micron and a maximum particle size of up to about 0.4 micron.

12. A process according to claim 1, wherein the synthesis of step (a) is carried out at up to about 5% by weight reactants in the aqueous medium.

13. A process according to claim 1, wherein the synthesis of step (a) is carried out at up to about 1% by weight reactants in the aqueous medium.

14. A process according to claim 1, wherein the synthesis of step (a) is carried out in the presence of from about 2% to about 50% by weight of a water-soluble resin, based on the weight of the pigment.

15. A process according to claim 1, wherein the aqueous medium further comprises from about 2% to about 50% by weight of a water-dispersible or water-soluble resin, based on the weight of the pigment.

16. A process according to claim 1, wherein the aqueous medium further comprises from about 1% to about 25% of a surfactant, based on the weight of the pigment.

17. A process according to claim 1, wherein the pigment is selected from the group consisting of azo pigments, monoarylide and diarylide pigments, and rhodamine pigments.

18. A process according to claim 1, wherein the pigment is an azo pigment.

19. A process according to claim 1, wherein the purified aqueous pigment dispersion is adjusted to a pigment concentration of from about 10% to about 40% pigment by weight.

20. A process according to claim 1, comprising a further step of drying the purified aqueous pigment dispersion to obtain a dry, purified pigment.

21. A process according to claim 20, further comprising a step of including the dry, purified pigment in an ink composition.

22. A process according to claim 1, comprising a further step of including the purified aqueous pigment in an aqueous ink composition.

23. A process according to claim 1, comprising a further step of combining the purified aqueous pigment with at least one additional material selected from the group consisting of varnishes, resins, organic solvents, and ink additives.

24. A process according to claim 1, further comprising a step of converting the purified aqueous pigment dispersion into an organic pigment dispersion.

25. A organic pigment dispersion produced according to the process of claim 24.

26. An ink including at least one purified pigment dispersion produced according to the process of claim 1.

27. An ink according to claim 26, wherein the ink is an ink jet ink.

28. An ink according to claim 26, wherein the ink is a flexographic ink.

29. A process according to claim 1, wherein the pigment dispersion comprises an acrylic polymer and a nonionic surfactant.

* * * * *